United States Patent
Dean et al.

(10) Patent No.: US 8,595,081 B2
(45) Date of Patent: Nov. 26, 2013

(54) METHOD AND SYSTEM FOR EFFICIENT CUSTOMIZED MANUFACTURE OF SHOES

(75) Inventors: Anthony Dean, Newberg, OR (US);
Thomas Berend, Beaverton, OR (US);
Ciro Fusco, Portland, OR (US)

(73) Assignee: Nike, Inc., Beaverton, OR (US)

( * ) Notice: Subject to any disclaimer, the term of this patent is extended or adjusted under 35 U.S.C. 154(b) by 330 days.

(21) Appl. No.: 13/122,705

(22) PCT Filed: Sep. 28, 2009

(86) PCT No.: PCT/US2009/058620
§ 371 (c)(1),
(2), (4) Date: Jun. 22, 2011

(87) PCT Pub. No.: WO2010/037029
PCT Pub. Date: Apr. 1, 2010

(65) Prior Publication Data
US 2012/0089477 A1 Apr. 12, 2012

Related U.S. Application Data

(60) Provisional application No. 61/194,355, filed on Sep. 26, 2008.

(51) Int. Cl.
*G06Q 30/00* (2012.01)
(52) U.S. Cl.
USPC ........................................................ 705/26.1
(58) Field of Classification Search
USPC ................................................ 705/26.1, 27.1
See application file for complete search history.

(56) References Cited

U.S. PATENT DOCUMENTS

| | | | | |
|---|---|---|---|---|
| 7,945,343 | B2 * | 5/2011 | Jones et al. | 700/97 |
| 2003/0033207 | A1 * | 2/2003 | Litke et al. | 705/26 |
| 2005/0071242 | A1 * | 3/2005 | Allen et al. | 705/26 |
| 2007/0043464 | A1 | 2/2007 | Zeif | |
| 2007/0043582 | A1 | 2/2007 | Peveto | |
| 2008/0060220 | A1 | 3/2008 | Lyden | |
| 2008/0134543 | A1 | 6/2008 | Klein | |
| 2008/0189194 | A1 | 8/2008 | Bentvelzen | |
| 2009/0254207 | A1 * | 10/2009 | Tiffany et al. | 700/97 |
| 2010/0036753 | A1 * | 2/2010 | Harvill et al. | 705/27 |

OTHER PUBLICATIONS

Wong, W. K., P. Y. Mok, and S. Y. S. Leung. "Developing a genetic optimisation approach to balance an apparel assembly line."The International Journal of Advanced Manufacturing Technology 28.3-4 (2006): 387-394.*
International Search Report and Written Opinion of Nov. 17, 2009 for Application No. PCT/US09/58620.

* cited by examiner

*Primary Examiner* — Matthew Zimmerman
(74) *Attorney, Agent, or Firm* — Shook, Hardy & Bacon L.L.P.

(57) ABSTRACT

Customized articles of footwear are produced by defining options that can be selected by a customer when submitting a custom order. These options typically include model options, functional options, and aesthetic options. These options are created by a design source, such as a shoe designer within a particular market, and presented to the customer when making the order. Upon a customer selecting one or more of the options at a user interface, the selected options are converted to specifications associated with the order. A work-load engine is employed to generate, based on the specifications, a work order that includes a dataflow for selecting appropriate stations on a manufacturing floor to participate in a manufacturing process, and a workflow for instructing each of the appropriate stations to perform a sequence of operations, within the manufacturing process, that result in fabricating individual components of the article of footwear according to the order.

18 Claims, 6 Drawing Sheets

FIG. 4.

| MODEL | FUNCTIONAL OPTIONS | | AESTHETIC OPTIONS | |
|---|---|---|---|---|
| RUNNING | HEEL HARDNESS | HARD / MEDIUM / SOFT | UPPER COLOR | RED / WHITE / BLUE |
| | MIDFOOT HARDNESS | HARD / MEDIUM / SOFT | MIDSOLE COLOR | RED / WHITE / BLUE |
| | FOREFOOT HARDNESS | HARD / MEDIUM / SOFT | OUTSOLE COLOR | RED / WHITE / BLUE |
| | MOTION CONTROL | NEUTRAL / PRONATION / SUPINATION | INSIGNIA | STAR / SMILEY / USER DEFINED |
| | VENTILATION | YES / NO | | |
| BASKETBALL | HEEL HARDNESS | HARD / MEDIUM / SOFT | UPPER COLOR | RED / WHITE / BLUE |
| | MIDFOOT HARDNESS | HARD / MEDIUM / SOFT | MIDSOLE COLOR | RED / WHITE / BLUE |
| | FOREFOOT HARDNESS | HARD / MEDIUM / SOFT | OUTSOLE COLOR | RED / WHITE / BLUE |
| | ANKLE SUPPORT | HIGH / MEDIUM / LOW | INSIGNIA | STAR / SMILEY / BALL / USER DEFINED |
| SKATE | HEEL HARDNESS | HARD / MEDIUM / SOFT | UPPER COLOR | RED / WHITE / BLUE |
| | MIDFOOT HARDNESS | HARD / MEDIUM / SOFT | MIDSOLE COLOR | RED / WHITE / BLUE |
| | FOREFOOT HARDNESS | HARD / MEDIUM / SOFT | OUTSOLE COLOR | RED / WHITE / BLUE |
| | | | INSIGNIA | STAR / SKATEBOARD / SKULL / USER DEFINED |

METHOD AND SYSTEM FOR EFFICIENT CUSTOMIZED MANUFACTURE OF SHOES

CROSS-REFERENCE TO RELATED APPLICATIONS

This application claims the benefit of U.S. Provisional Application No. 61/194,355, filed Sep. 26, 2008, entitled EFFICIENT METHOD AND SYSTEM FOR CUSTOMIZED MANUFACTURING OF SHOES, herein incorporated by reference.

TECHNICAL FIELD

The present invention relates to the manufacturing of shoes. More particularly, the present invention relates to customized, on-site, shoe manufacturing.

BACKGROUND OF THE INVENTION

The manufacture of shoes has changed little over the past hundred years or more. Automation has had little impact on shoe manufacturing due to the labor-intensive aspects of shoe production. For example, forming the upper of a shoe may involve the careful cutting alignment, attachment, decoration, and the like of numerous separate pieces, largely or entirely by hand. However, such a high labor approach necessarily introduces variability in quality of product that is not desirable. Further, the requirement of a high amount of hand labor to manufacture a single pair of shoes has limited the ability for readily available as-desired customized shoes at a price deemed acceptable by most consumers.

SUMMARY OF THE INVENTION

The present invention relates to efficient shoe manufacturing methods and systems that reduce the specialized individual labor required for shoe production, while avoiding high costs associated with highly automated manufacturing equipment. Systems and methods in accordance with the present invention may be used to produce customized articles of footwear at a single, efficient facility. For example, the articles of footwear may be produced at the same facility at which they are ordered by a customer.

Exemplary embodiments of the present invention permit the customer to select a particular model option of an article of footwear, select functional options for the article of footwear and/or select aesthetic options for the article of footwear at an order interface. These selected options may be conveyed to a work-order engine that generates a work order for a particular article of footwear desired by the customer. In one instance, the work order includes information for implementing a dataflow and a workflow within a modularized manufacturing environment. Based on the dataflow, appropriate stations on a manufacturing floor, within the modularized manufacturing environment, are selected to participate in the manufacturing process. These stations may include an outsole station for fabricating an outsole component, a midsole station for fabricating a midsole component, an upper station for fabricating an upper component, and other stations for assembling the components. Based on the workflow, each of the selected appropriate stations is instructed to perform a sequence of operations that result in fabricating the components of the ordered article of footwear in compliance with the options selected by the customer. Accordingly, upon assembly of the fabricated components, the resultant article of footwear embodies the selected options of the order.

BRIEF DESCRIPTION OF THE DRAWING

The present invention is described in detail below with reference to the attached drawing figures, wherein:

FIG. 4 illustrates examples of options selectable in the efficient production of articles of footwear, in accordance with embodiments of the present invention;

DETAILED DESCRIPTION OF THE INVENTION

Figure 1:
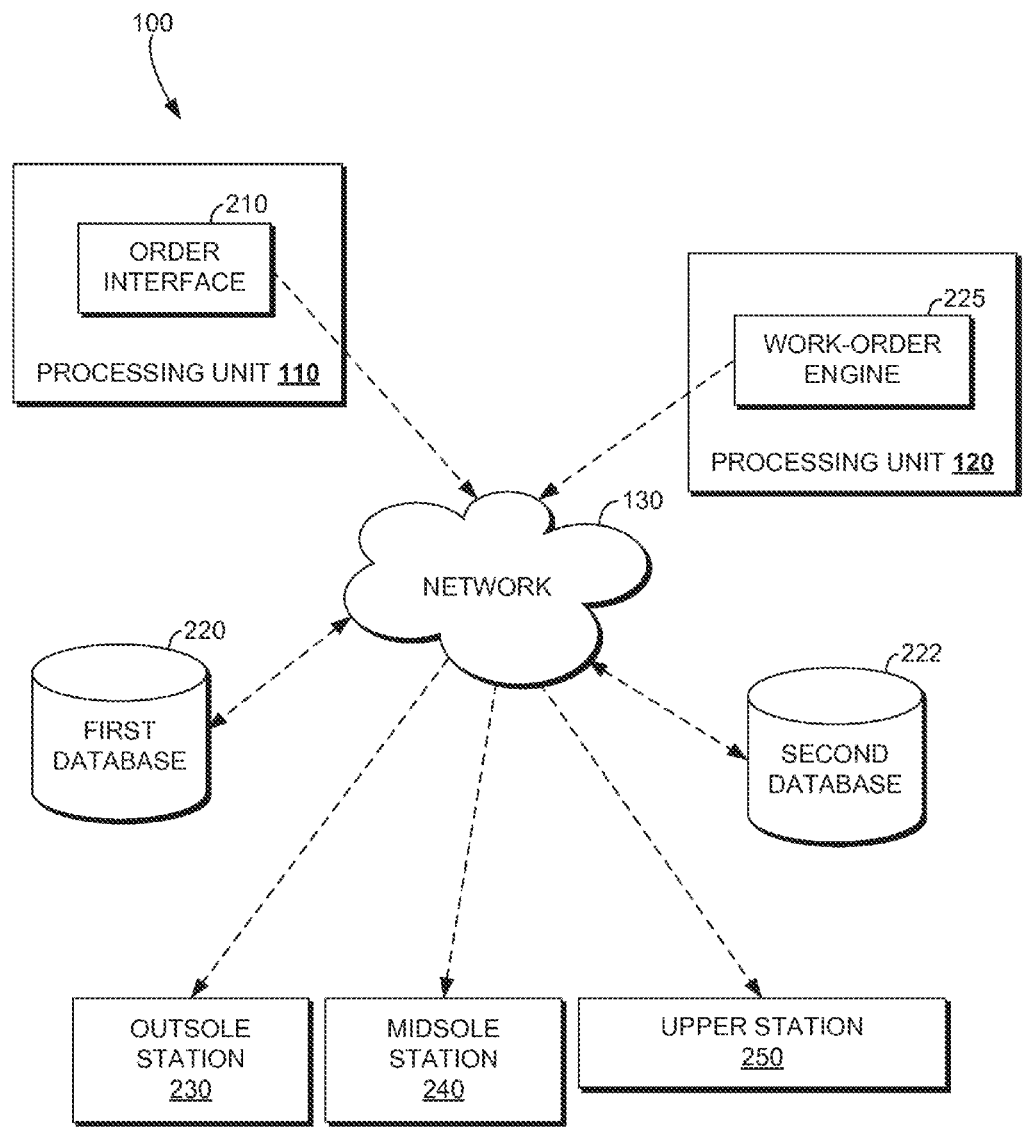
FIG. 1 is a schematic diagram of an exemplary system architecture suitable for use in implementing embodiments of the present invention, in accordance with an embodiment of the present invention.

The subject matter is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Systems and methods in accordance with embodiments of the present invention may be used for the efficient manufacturing of customized articles of footwear (e.g., running shoes, basketball shoes, skate shoes, and the like). When placing an order for an article of footwear, the customer may be presented with a host of options rendered at an order interface. Via the order interface, the customer may place the order by selecting one or more of the options, such as a model, functional aspects (e.g., hardness and color scheme of a midsole), and aesthetic aspects (e.g., pattern of digital painting on upper). These selected options may be converted to specifications of the ordered article of footwear and used to generate a work order. Used herein, the phrase "work order" is not meant to be limiting, but may broadly encompass any schedule, set of instructions, or listing of action items that can be used to govern the construction of an article of footwear, whether digitally stored/transmitted or paper-based. By way of example, a work order may include an indication of one or more options selected by the customer when placing the order. Moreover, the work order may include a sequence of operations that are built on the selected options. Typically, the sequence of operations provides instructions to at least one station on a manufacturing floor on how to fabricate component(s) (e.g., outsole, midsole, and upper) of the article of footwear in compliance with the order.

In an exemplary embodiment, the work order includes information for implementing a dataflow and a workflow. The term "dataflow," as used herein, generally refers to where information related to the order, such as the sequence of operations, is sent. In one instance, based on the dataflow, appropriate stations (e.g., outsole station, midsole station, and upper station) on a manufacturing floor are selected to participate in a process for manufacturing the ordered article of footwear. The term "workflow," as used herein, generally refers to what steps or procedures the appropriate stations (participating in the manufacturing process) are expected to take. In one instance, based on the workflow, each of the appropriate stations are instructed to perform the sequence of operations that result in fabricating components of the article of footwear. Upon assembly of the components, the resultant article of footwear embodies the options that were selected when placing the order.

Turning to FIG. 1, embodiments of the invention may be described in the general context of a modularized manufacturing environment for generating an article of footwear from basic, unprocessed materials. In particular, the modularized manufacturing environment is responsive to direct sales orders, which are placed at an order interface 210. The orders are processed at the work-order engine 220 to generate work orders, which enable the production of personalized footwear that meet the specifications of the orders. Accordingly, this environment may be flexible allowing for various customizations and/or models of a type of footwear (e.g., track-style versus cross-country-style running shoes), and is adaptable to produce various types of footwear (e.g., running shoes versus basketball shoes).

With continued reference to FIG. 1, a schematic diagram of an exemplary system architecture 100 suitable for use in implementing embodiments of the present invention is shown, in accordance with an embodiment of the present invention. Initially, the exemplary system architecture 100 includes processing units 110 and 120, a first database 220, and a second database 222 that are interconnected through a network 130, or by any other method known in the relevant field. In embodiments, the network 130 may include, without limitation, one or more local area networks (LANs) and/or wide area networks (WANs). Such networking environments are commonplace in offices, enterprise-wide computer networks, intranets, and the Internet. Accordingly, the network 130 is not further described herein.

As illustrated, operation of the order interface 210 is supported by the processing unit 110, while operation of the work-order engine 220 is supported by the processing unit 120. The processing units 110 and 120 may take the form of various types of computing devices. By way of example only, the processing units 110 and 120 may be a personal computer, handheld device (e.g., personal digital assistant), a mobile device (e.g., laptop computer, cell phone, media player), a consumer electronic device, various servers, and the like.

In one embodiment, the processing unit 110 may be configured to render a UI display consistent with the order interface 210, where the order interface 210 may be configured as any input/output application capable of revealing information to a customer and gathering information from a customer. In one instance, the UI display is rendered on a presentation component (not shown) that may a device adapted to present content to the customer, such as a monitor, electronic display panel, touch-screen, liquid crystal display (LCD), plasma screen, or any other display type. Also, the processing unit 110 may configured to accept manual input(s) from the customer affecting, among other things, the options selected in an order for an article of footwear. In an exemplary embodiment, an input component (not shown) is provided to receive the input(s) directed at content rendered within the UI display. Illustrative input components include a touchpad, keyboard, mouse, touchscreen, or any other component capable of receiving the manual input(s) and communicating indications of those inputs to the processing unit 110.

The first database 220 is generally configured to receive options from a design source (see reference numeral 215 of FIG. 2), where the options allow the customer to customize the article of footwear. As more fully discussed below, the options include at least one of model options, functional options, or aesthetic options. Further, the first database 220 is generally configured to provide these options to the order interface 210 for presentation to the customer. Upon placing the order with the order interface 210, the options that were selected by the customer are sent to the second database 222 for storage. That is, the second database 222, which is accessible to the work-order engine 225, is configured to store the selected options in association with the customer.

Accordingly, the first database 110 and the second database 120 are generally configured to store information associated with ordering articles of footwear and/or preferences of a customer with respect to model, functionality, and aesthetics of an article of footwear. In addition, the first database 110 and the second database 120 may be configured to be searchable for suitable access of stored information. It will be understood and appreciated by those of ordinary skill in the art that the information stored in the first database 110 and the second database 120 may be configurable and may include any information relevant ordering of article of footwear. The content and volume of such information are not intended to limit the scope of embodiments of the present invention in any way. Further, though illustrated as single, independent components, the first database 110 and the second database 120, in fact, may be a plurality of data stores, for instance, a database cluster, portions of which may reside on the processing units 110 and 120.

The exemplary system architecture 100 of FIG. 1, may further include stations within the modularized manufacturing environment that are interconnected to the work-order engine 225 (e.g., via the network 130). As illustrated, the stations include an outsole station 230, a midsole station 240, and an upper station 250. In one configuration, the stations 230, 240, and 250 of the modularized manufacturing environment are adapted to execute a manufacturing process of single flow customization. This single flow manufacturing process employs a production model that includes micro-manufacturing building blocks referred to herein as stations. The concept of "stations" should not be construed as limiting and may encompass any portion of a manufacturing process or device that facilitates a piece of a manufacturing processes. It should be understood and appreciated that the designation of "stations" is not meant to be limiting, and should be interpreted broadly to include one or a plurality of manufacturing tasks (e.g., fabrication and assembly) that may be performed by independent-functioning processing areas, as well as the devices and personnel that implement the manufacturing tasks designated to a particular station.

These separate stations 230, 240, and 250 may be interconnected via the workflow, as discussed above. In one instance, several stages of the manufacturing process are performed within a station on a partially-complete footwear article. Upon, performing the last of these stages, the partially-completed footwear article is passed to another station, as indicated by the workflow, created for that subject footwear article. For instance, one stage of a manufacturing process implemented at the outsole station 230 may encompass placing an outsole component in a marketplace that feeds into another station (e.g., pre-assembly station 235 of FIG. 2) for assembly to a complementary midsole component. Thus, by utilizing systems and methods in accordance with the present invention, the ordered article of footwear may be manufactured at the same location that a customer made his or her order.

Figure 2:
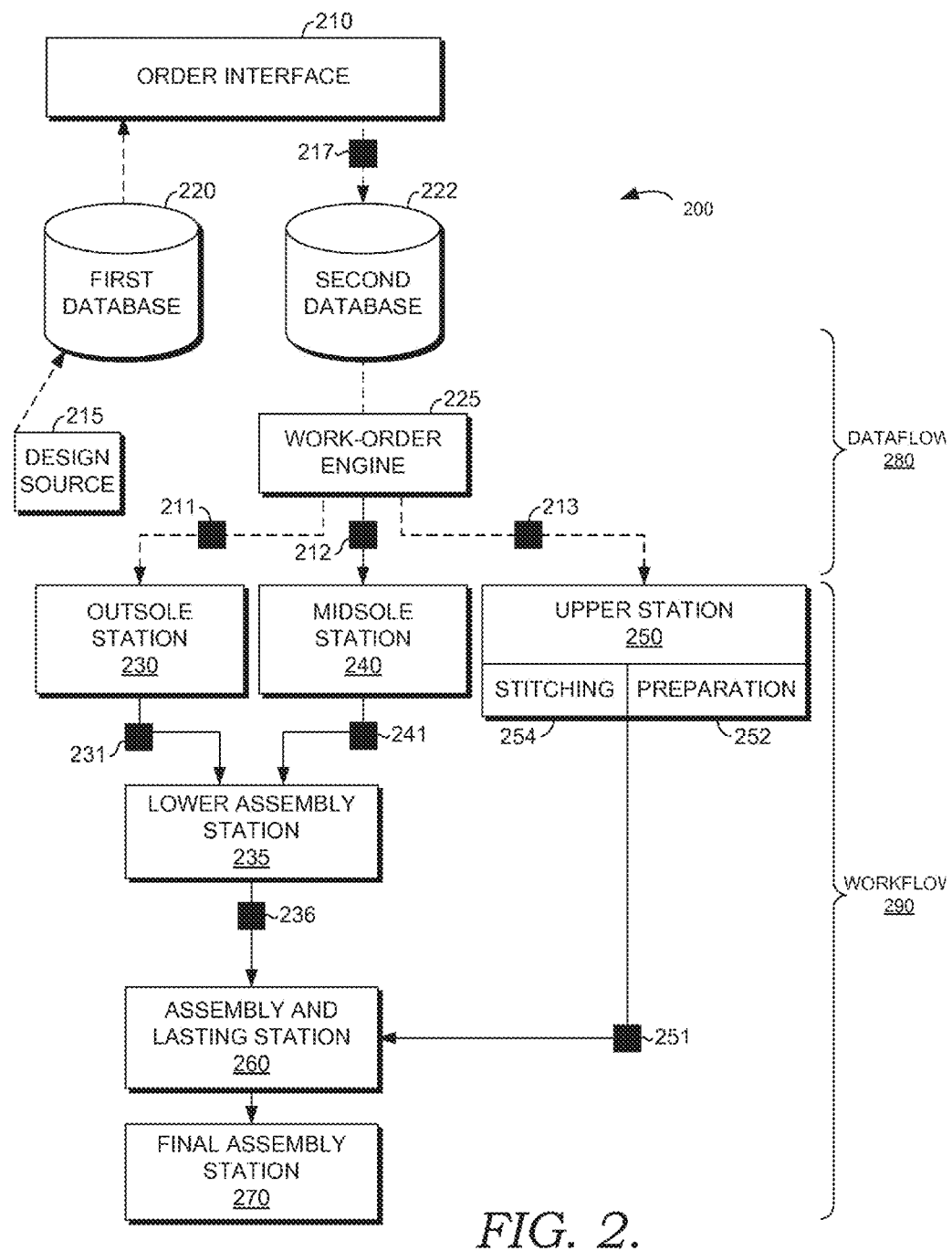
FIG. 2 is a block diagram of an exemplary modularized manufacturing environment suitable for use in implementing embodiments of the present invention.

Turning now to FIG. 2, a block diagram illustrating an exemplary modularized manufacturing environment 200, suitable for use in implementing embodiments of the present invention, is shown. Initially, the modularized manufacturing environment 200 includes the first database 220 and the second database 222 interconnected with the order interface 210. Also, a design source 215 is coupled to the first database 220, where the design source 215 may comprise any entity capable of creating a variety of options for articles of footwear and communicating those options to the first database 220. For instance, the design source 215 may be a shoe designer within a particular market that conceives of shoes to offer to that market.

In operation, the options created by the design source 215 are conveyed to the first database 220 and persisted until needed. Once a customer initiates a process of ordering an article of footwear, the order interface 210 pulls the proper options from the first database 220, based on a style or type of shoe being ordered, and presents those options to a customer in a UI display. Upon the customer selecting one or more options that he or she prefers, those selected options are gathered by the order interface 210 and submitted to the second database 222 as an order 217 for an article of footwear. As discussed above, the second database 222 may save the order 217 in association with the customer that placed the 217 order. For example, if the customer selects a given shoe model, given functional options, and given aesthetic options, all of which may be stored in second database 222 in an order record. At any time during the storage of the order 217, the work-order engine 225 may access the second database 222 and retrieve the entire order 217, or just portions thereof. Upon accessing the order, the work-order engine 225 can then commence fulfilling the order 217. Or, the work-order engine 225 may insert the order 217 into a workload schedule for fulfillment at some future time, where the workload schedule includes other orders that are currently pending and that rely on resources common to those potentially allocated for fulfilling the order 217.

Often, a completion deadline is associated with the inserted order 217. Typically, the completion deadline is based on a timeframe at which the order was received at the order interface 210. For instance, the completion deadline may be statically set at three days from the placement of the order 217. In other instances, the completion deadline may be set dynamically based on a sales agreement, the latest advertising literature, or other policies agreed to be the customer. As discussed with reference to FIG. 1, the first database 220 and second database 222 may operate using the same or different computing resources such as servers and/or storage media, and may be geographically remote from the other elements of modularized manufacturing environment 200.

Generally, the work-order engine 225 is configured to manage satisfaction of the order 217. Managing the satisfaction of the order 217 may include the steps of retrieving the order 217 from the second database 222 and converting the options selected by the customer when placing the order 217 into specifications of a particular article of footwear. Using the specifications, the work-order engine 225 may generate a work order that governs the production of the article of footwear. In one instance, the work order includes information for implementing a dataflow 280 and a workflow 290.

As illustrated in FIG. 2, the dataflow 280 selects the appropriate stations on a manufacturing floor to participate in the production of the article of footwear. In the embodiment shown in FIG. 2, the appropriate stations include the outsole station 230, the midsole station 240, and the upper station 250. Typically, which stations within a local or remote manufacturing floor are selected for employment in the production of the article of footwear may involve accessing and reviewing certain criteria related to the stations. Accordingly, in one instance, selecting the appropriate stations includes determining a workload capacity of each of the outsole station 230, the midsole station 240, and the upper station 250, and, based on the determined workload capacity, ascertaining whether to select one or more of the stations 230, 240, and/or 250 for participation in the manufacturing process. In another instance, the criteria used for selecting stations may include a workload schedule, or queue, that includes the order of the customer as well as other orders from other customers. As such, the selection of the appropriate stations may include determining the number and timing of the other orders scheduled for the outsole station 230, the midsole station 240, and the upper station 250, based on the workload schedule, and ascertaining whether to select one or more of the stations 230, 240, and/or 250 for participation in the manufacturing process based on their presently queued orders.

Further, the dataflow 280 manages what data is sent to the selected appropriate stations. For instance, the dataflow 280 indicates which sequence of operations is sent to one or more of the select appropriate stations. By way of example, a sequence of operations are a set of automated or manual commands that instruct a machine or human operator, respectively, what actions to carry out in order to fabricate a component of the ordered article of footwear consistent with the specifications. As illustrated in FIG. 2, a sequence of operations 211 may be distributed to the outsole station 230 that instructs the outsole station 230 which features (e.g., material, size, and the like) to incorporate into an outsole component 231 that is fabricated in compliance with the order 217. In another instance, a sequence of operations 212 may be distributed to the midsole station 240 that instructs the midsole station 240 which features (e.g., hardness, color, and the like) to incorporate into a midsole component 241 that is fabricated in compliance with the order 217. In yet another instance, a sequence of operations 213 may be distributed to the upper station 250 that instructs the upper station 250 which features (e.g., pattern of digital paint, type of etching, and the like) to incorporate into an upper component 251 that is fabricated in compliance with the order 217. Accordingly, the sequences of operations 211, 212, and 213 are distributed to those stations 230, 240, and 250, respectively, that are selected as the appropriate stations for carrying out the workflow 290. Further, the sequences of operations 211, 212, and 213 are customized to comply with both the order 210 and the capabilities of the stations (e.g., stations 230, 240, and 250) to which they are conveyed.

Once the sequences of operations 211, 212, and 213 are created and distributed to the appropriate stations 230, 240, and 250, as governed by the dataflow 280, the workflow 290 is performed. Generally, the workflow 290 involves performing the sequence of operations 211, 212, and 213 at each of the appropriate stations 230, 240, and 250, respectively, which results in fabricating components 231, 241, and 251 of the article of footwear. In one instance, the workflow 290 involves the outsole station 230 carrying out the sequence of operations 211 distributed thereto and fabricating the outsole component 231 of the article of footwear in compliance with the specifications. In another instance, the workflow 290 involves the midsole station 240 carrying out the sequence of operations 212 distributed thereto and fabricating the midsole component 241 of the article of footwear in compliance with the specifications.

Upon fabrication of the outsole component 231 and the midsole component 241 according to the order 217, the workflow 290 may involve combining the outsole component 231 and the midsole component 241 at a lower assembly station 235 to form a lower component 236. Combining may include inspecting bar codes (e.g., from pre-established listing) that identify the outsole component 230 and the midsole component 240 as being fabricated based on the order 217. Combining may further include, based on the inspection, picking the outsole component 230 and the midsole component 240 for being joined in the combination. By way of example, the selected bar codes are affixed, or coupled in any manner, with the outsole component 230 and the midsole component 240 during the sequences of operations 211 and 212, respectively. Combining may further include joining the outsole component 231 and the midsole component 241 into the lower component 236 by employing any method of adhesion known in the relevant technology.

In yet another instance, the workflow 290 involves the upper station 250 carrying out the sequence of operations 213 distributed thereto and fabricating the upper component 251 of the article of footwear in compliance with the specifications. In embodiments, fabricating the upper component 251 includes preparing the upper component 251, or shoe upper, in accordance with model options, the functional options, and/or the aesthetic options selected by the customer at the order interface 210, and stored in an order record in the second database 222. Upper station 250 may comprise a number of substations, for example, a part preparation substation 252 and/or a stitching substation 254. For example, the preparation substation 252 may serve functions such as cutting the upper component 251 from sheets of material (e.g., synthetic, leather, and/or fabric), coloring the upper component 251, etching the upper component 251, or otherwise preparing the upper component 251 for assembly. By way of further example, upper station 250 may comprise a first substation that cuts upper components from sheets of material and places those components into kits containing all of the components necessary for a single shoe upper, a second substation that customizes the shoe upper by placing aesthetic decorations on the shoe upper based upon customer selections, and a third substation that forms the shoe upper components into a three dimensional shoe upper suitable for final assembly with a midsole and an outsole.

The stitching substation 254 may stitch portions of the upper component 251 together to a single integral piece that may thereafter be affixed to a combined midsole component 231 and outsole component 241, to form the ordered article of footwear. The stitching substation 254 may alternatively or additionally utilize adhesives, HF welding, ultrasonic welding, heat and/or pressure joining of upper materials, or other affixing techniques and technologies. The materials used to form an upper may be selected based, at least in part, on the fashion in which the upper component 251, the midsole component 231, and outsole component 241 are to be joined together to from an article of footwear. The completed upper 251 may pass from upper station 250 to an assembly and lasting station 260. At the assembly and lasting station 260, the upper component 251 (customized pursuant to the model option, functional options, and/or aesthetic options of the order 217) may be combined with the appropriate lower component 236 in response to an order entry. Again, the combination may be based on bar-codes, or any other identifier, associated with the upper component 251 and the lower component 236 and that identify the upper component 251 and the lower component 236 as being fabricated based on the order 217. After the assembly and lasting station 260, a partially completed article of footwear may be transmitted to final assembly station 270. At the final assembly station 270, final processes may be performed to render the ordered article of footwear ready for presentation to the customer. The finished article of footwear may be delivered to the customer, for example, at an order station proximate to the order interface 210, for presentation, inspection, acceptance, and payment.

Figure 3:
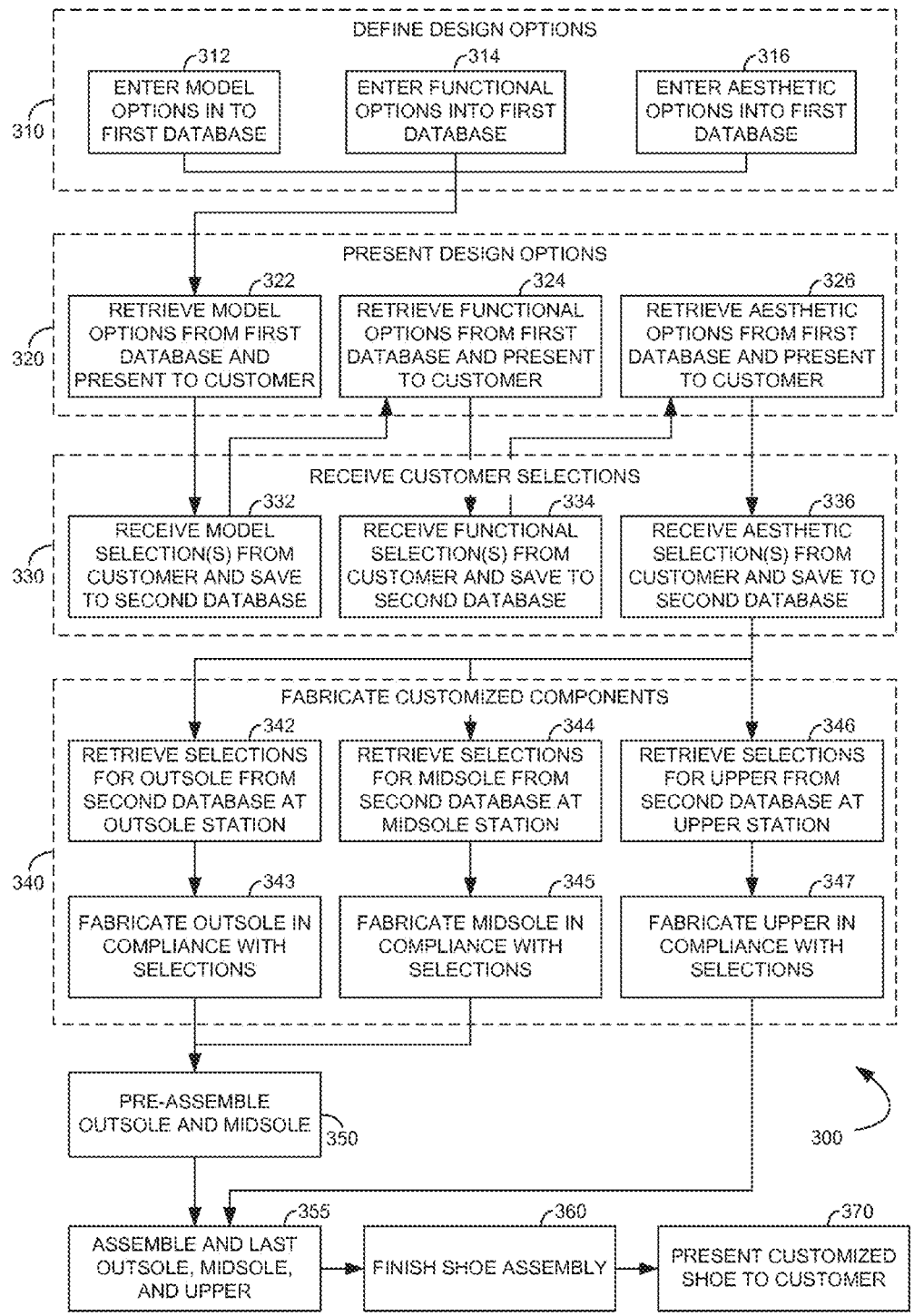
FIG. 3 illustrates an exemplary method for efficiently producing customized articles of footwear, in accordance with embodiments of the present invention.

Referring now to FIG. 3, a further method 300 for efficiently producing customized articles of footwear is illustrated. Method 300 may begin with a step 310 of defining design options. Defining design option step 310 may be performed, for example, by a shoe designer or design team as part of designing shoes and the manufacturing process to create those shoes. Design definition step 310 may comprise a number of substeps, that may be performed in parallel, in series, or in some combination. For example, design definition step 310 may include substep 312 of entering model options into a first database (e.g., the first database 220 of FIG. 2). Step 312 may result, for example, in the definition of a running shoe model, a basketball shoe model, and a skate shoe model as available shoe models for ordering. In substep 314, functional options for the articles of footwear may be entered into the first database. Substep 314 may include entering the functional options that are dependent on a given shoe model option entered in substep 312. For example, a running shoe model may include functional options such as motion control options to make a shoe appropriate for a neutrally gaited runner, a supinating runner, or a pronating runner. In substep 316, aesthetic options may be entered into the first database. Substep 316 may be dependent upon the model options defined in substep 312 and/or the functional options defined in substep 314. For example, the aesthetic options of placing an insignia over the ankle of a left and/or right article of footwear would not be possible for a low-topped running shoe model (such as may be defined in substep 312) that does not cover a user's ankle.

In design presentation step 320, a customer may be presented with various design options (e.g., at the order interface 210) from which the customer may select in step 330 of receiving customer selections. The interrelation between the substeps of the present design option step 320 and the receive customer selection step 330 may vary, but are illustrated for the instance where functional options are potentially dependent upon the model option selected, and the aesthetic options available are dependent upon the model options selected and/ or the functional options selected. If there is not such an interrelationship between the different available options (model, functional, and aesthetic), the ordering of the substeps in the present options step 320 and the receive customer selection step 330 may vary from that depicted here.

In substep 322, model options may be retrieved from the first database and presented to a customer. In substep 332, model option selections may be received from a customer and saved to a second database (e.g., the second database 222 of FIG. 2). In substep 324, functional options may be retrieved from the first database and presented to a customer. The functional options retrieved and presented in step 324 may be dependent upon the model options selected by the customer in substep 322. In substep 334, the functional selections may be received from a customer and stored to a second database.

In step 326, aesthetic options may be retrieved from the first database and presented to the customer. The aesthetic options available to a customer and retrieved and presented in substep 326 may be dependent upon the functional selections of a customer in substep 334 and/or the model selection received from a customer in substep 322. In substep 336, aesthetic selections may be received from a customer and saved to a second database.

In step 340, a shoe's customized components may be fabricated. Generally speaking, step 340 permits the fabrication of a shoe outsole (i.e., outsole component 231 of FIG. 2), a shoe midsole (i.e., midsole component 241 of FIG. 2), and a shoe upper (e.g., upper component 251 of FIG. 2) in parallel processes. In substep 342, selections relevant to the fabrication of an outsole component may be retrieved from the second database at an outsole station (e.g., the outsole station 230 of FIG. 2). Thereafter, the outsole component may be fabricated in compliance with the selections in substep 343 (i.e., embodied in the work order). However, substep 342 of retrieving selections may be omitted in some instances, for example, if a lean manufacturing marketplace is used to direct fabrication of the outsole component. In this instance, the use of outsole components meeting specified selections in the construction of ordered shoes will result in a reduced inventory of those outsole components. The outsole station may thereafter fabricate additional outsole components in compliance with those selections in substep 343 without directly retrieving selections from the second database in substep 342.

In substep 344, selections relevant to a midsole component may be retrieved from the second database at a midsole station (e.g., the midsole station 240 of FIG. 2). In substep 345, the midsole component may be fabricated in compliance with those selections. However, as with substep 342 and substep 343 for outsole fabrication, substep 344 and step 345 for midsole component fabrication may be modified or omitted through the use of a lean manufacturing marketplace that would indicate what variety of options should be included in a fabricated midsole component to bring inventory levels of a given type of midsole component up to an acceptable level within the marketplace.

In substep 346, selections for an upper component may be retrieved from second database as an upper station (e.g., the upper station 250 of FIG. 2). In substep 347, the upper component may be fabricated in compliance with the selections. Substep 346 may indicate, for example, that upper components having a particular size and suited to a particular model of shoes should be cut from certain types of materials determined by the selections. Substep 346 may further indicate that substep 347 should combine those upper components using particular materials and processes, such as stitching some portions together and using radio frequency welding techniques to affix others, with given ornamentation (such as coloration, insignia, and/or embroidery patterns) included on all or some of the upper components.

The fabricated outsole component from substep 343 and the fabricated midsole from substep 345 may be combined during a pre-assembly operation in step 350 to create a lower component. The lower component may be stored or passed directly to another station configured to assemble the lower component with and the fabricated upper component from substep 347. The process of assembly is depicted in step 355. Besides assembly, step 355 may include the processing of lasting the lower component (outsole component joined to the midsole component) and the upper component in a fashion that complies with customer selections. In step 360, the assembly of the components may be finished into the ordered article of footwear. In step 370, the customized article of footwear may be presented to the customer.

Referring now to FIG. 4, a variety of potential, but non-exclusive, selections that may be included in an order for a customized article of footwear are illustrated in scheme 400. For example, model options may include a running shoe 410, a basketball shoe 420, and a skate shoe 430, one of which may be selected by a customer. Of course, other shoe models may be offered and constructed in accordance with the present invention. Functional-option selections 440 may include a variety of areas and types of functional options that may vary dependent upon the model selected. For example, a running shoe model may have options with regard to heel hardness, mid-foot hardness, forefoot hardness, motion control, and/or ventilation. A basketball model, on the other hand, may have a different set of functional options, some of which are common to the running shoe model. Each functional option may have two or more possibilities, at least some of which may optionally be customer defined. For example, heel hardness may be selected to be hard, medium, or soft. A further possibility for customization may be found in the aesthetic options. Of course, functional options beyond the examples shown in FIG. 4 may be used.

Aesthetic option selections 450 may vary based upon shoe model and, further, may vary based upon functional options selected. Aesthetic options illustrated as possibilities in FIG. 4 include color of various shoe components, insignias used, but may include further options as well. Aesthetic options may, for example, be user defined. For example, the aesthetic option of an insignia may be user defined by the creation of a user using a graphical user interface or by preparing an appropriate insignia that may be scanned into a computer and entered into the second database. Of course, aesthetic options beyond those illustrated in FIG. 4 may be used.

Figure 5:
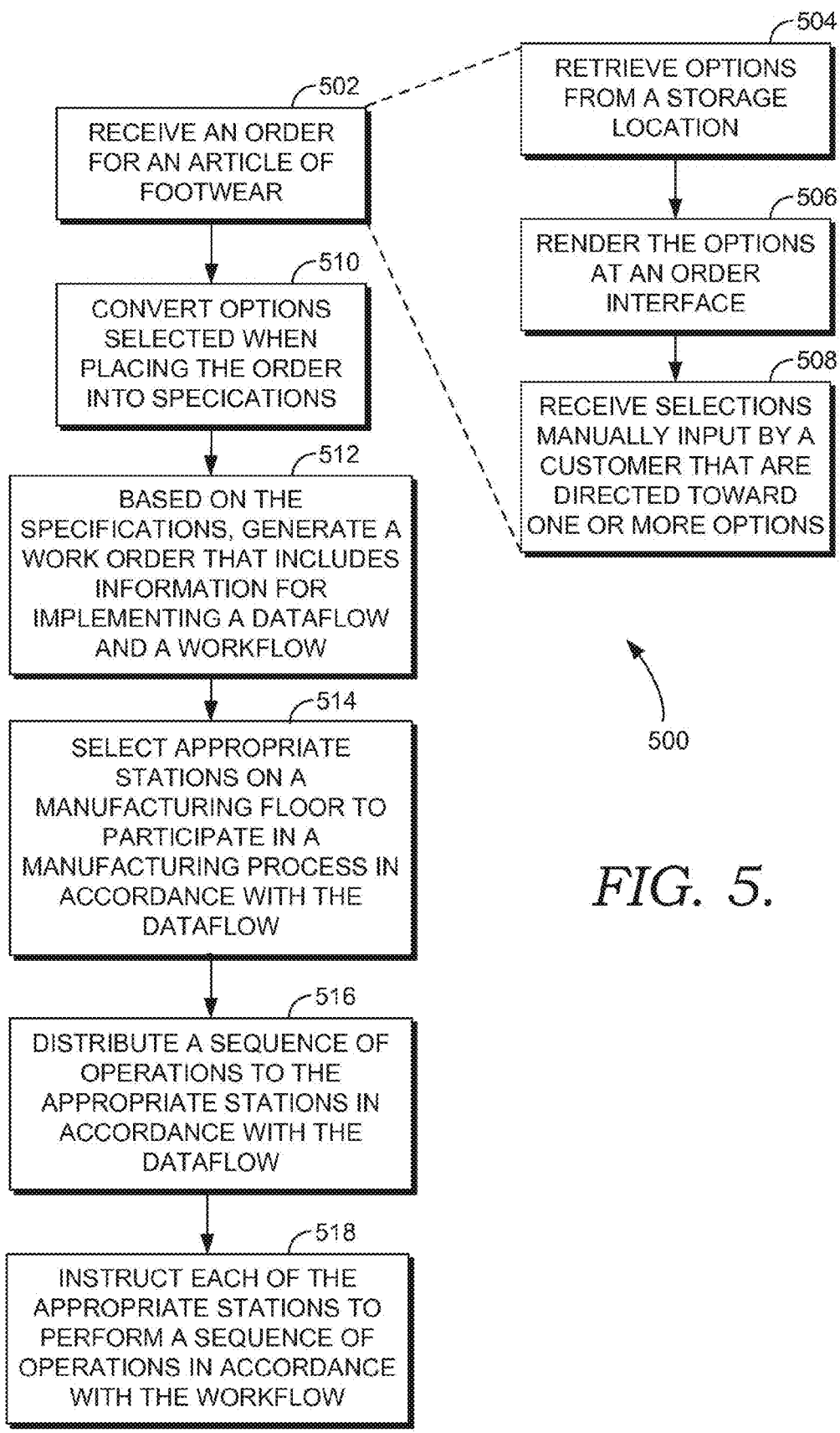
FIG. 5 illustrates a flow diagram showing an overall method for manufacturing an article of footwear according to an order placed by a customer, in accordance with embodiments of the present invention.

Referring now to FIG. 5, a flow diagram is illustrated that shows an overall method 500 for manufacturing an article of footwear according to an order placed by a customer, in accordance with embodiments of the present invention. Initially, as depicted at bloc 502, an order for the article of footwear is received, typically at an order interface. In embodiments, the process of receiving an order includes one or more of the following steps: retrieving options from a storage location that comprise at least one of model options, functional options, or aesthetic options (see block 504); rendering the options at the order interface (see block 506); and receiving selections manually input by the customer that are directed toward one or more of the options (see block 508). As depicted at block 510, the selected options are converted into specifications of the ordered article of footwear.

Based on the specifications, the method 500 may further involve generating a work order that includes information for implementing a dataflow and a workflow, as depicted at block 512. As discussed above, the work order facilitates managing satisfaction of the order. As depicted at block 514, appropriate stations on a manufacturing floor are selected to participate in the manufacturing process, in accordance with the dataflow. A sequence of operations are distributed to the appropriate stations, in accordance with the dataflow, as depicted at block 516. As depicted at block 516, each of the appropriate stations are instructed to perform the sequence of operations, in accordance with the workflow. As discussed above, the sequence of operations result in fabricating components of the article of footwear that, upon assembly, embody the ordered article of footwear.

Figure 6:
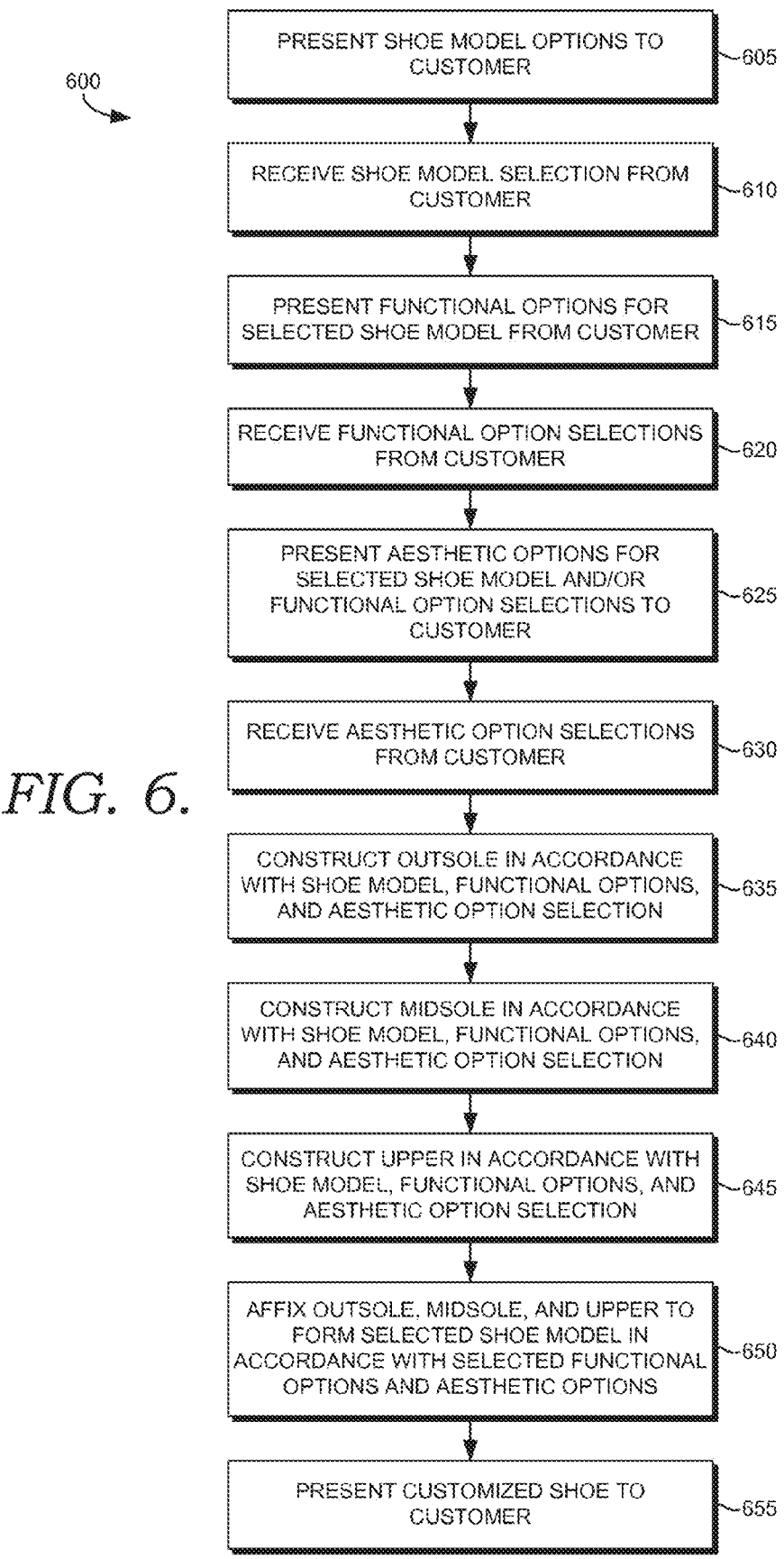
FIG. 6 illustrates a flow diagram showing an overall method for receiving one or more options selected by a customer when placing an order, in accordance with embodiments of the present invention.

Turning now to FIG. 6, a flow diagram is illustrated that shows an overall method 600 for receiving one or more options selected by a customer when placing an order, in accordance with embodiments of the present invention. Initially, as depicted at block 605, shoe model options may be presented to a customer. By way of example, shoe model options presented in block 605 may include a running shoe model, a basketball shoe model, and a skate shoe model. Of course, other types of shoe models, both athletic and non-athletic, may alternatively or additionally comprise available shoe model options presented in block 605. Further, block 605 may comprise, for example, presenting information describing the available shoe model options to a customer on UI display rendered on a display device by the order interface, which resides on a processing unit (e.g., computer).

As depicted at block 610, a customer's shoe model selection may be received at the order interface. For example, actions performed at block 610 may comprise receiving a user selection of an option of a presented shoe model from within a UI display. For example, a customer may select a checkbox associated with an option for a running shoe model to indicate that he or she would like to order a running shoe.

As depicted at block 615, functional options for the selected shoe model may be presented to the customer. Similar to block 605, step 615 may be performed, for example, within a UI display rendered by the order interface operating on a computer. Functional options may include parameters such as shoe size. Other types of options that may be selected in block 615 may include midsole hardness options, support options, motion control options, and the like. It should be appreciated that the options selected at block 615 need not necessarily be presented after block 605 and 610, but that in many instances the functional options available may depend upon the shoe model selected. For example, functional options relating to foot motion control may be relevant to a running shoe and therefore made available for customer selection after a customer has selected a running shoe model, while motion control options are not relevant for a basketball shoe, and therefore need not be available for basketball shoe models. One or ordinary skill in the art will readily appreciate any number of other types of functional options that are relatively specific to one or more particular model type of shoe.

As depicted at block 625, aesthetic options for the selected shoe model and/or functional options may be presented to the customer. Block 625 may occur using a graphical user interface on a computer, similarly to block 605 and block 615. The aesthetic options presented in block 625 may depend, at least in part, upon the model option selected by a customer and/or the functional options selected by a customer. However, it is also possible that aesthetic options may exist entirely or partially independent of model and/or functional options, in which case block 625 may occur prior to or in conjunction with block 605 and/or block 615. For example, options regarding shoe color may not depend upon shoe model or functional options. On the other hand, options relating to the color of a particular functional element, for example, will necessarily be dependent upon whether that functional element has been selected, either as part of a shoe model selection or as a functional option.

As depicted at block 630, the aesthetic option selections may be received from the customer. Block 630 may be performed, for example, by receiving customer selections using a pointing device in a graphical user interface on a computer, for example, by clicking checkboxes appropriate for each aesthetic option selected.

As depicted at block 635, an outsole component may be constructed in accordance with the shoe model, functional options, and/or aesthetic options selected by a customer. It should be noted that block 635 need not be necessarily initiated by a specific selection by a specific customer. For example, a predetermined level of inventory of outsole components having various characteristics may be maintained. For example, outsole components in three different colors may be made in each available size for each of three different models of shoes available at a facility. Outsole components may then be used from the inventory based upon customer orders. Whenever a given model, size, and color of outsole begins to run low in inventory, an operator may then construct additional outsoles meeting those parameters. In this way, block 635 may be performed in a way that is responsive to the shoe model, functional options, and/or aesthetic options selected by customers, while not being directly initiated by those customer selections. Further, block 635 may be performed in different ways for different types of outsole components, for example by using an inventory system for commonly used outsoles and producing less commonly used outsoles only in response to orders requiring them.

As depicted at block 640, a midsole component may be constructed in accordance with the shoe model, functional options, and/or aesthetic options selected by a customer. Similarly to block 635, block 640 need not be initiated in response to any given shoe order by a particular customer, but may instead optionally utilize an inventory system to produce midsole components having the desired characteristics. Also, similar to block 635, block 640 may be performed in different ways for different types of midsoles.

As depicted at 645, an upper component may be constructed in accordance with the shoe model, functional options, and/or aesthetic options selected by a customer. While block 645, similar to block 635 and block 640, may be performed without regard to any particular order by a customer, in practice the customization attainable in an upper component will likely result in block 145 being performed in response to a specific customer order. For example, block 645 may construct an upper for a running shoe having a red color. Similarly, block 645 may operate to construct upper components for other types of shoe models, such as basketball shoes or skate shoes, having any of a variety of functional characteristics, such as additional ankle support, side ventilation, and other similar functional options, with any of a variety of aesthetic options, such as particular colors, stitching patterns, insignia, and the like.

As depicted at block 650, the outsole, midsole, and upper components may be affixed together to form the selected shoe model in accordance with the selected functional options and aesthetic options desired by the customer. Block 650 may comprise, for example, matching the appropriate outsole, the appropriate midsole, and a specially customized upper components to form a single shoe as ordered by a customer.

As depicted at block 655, the customized shoe, or other article of footwear, may be presented to a customer. Block 655 may further include inspection and approval by a customer, payment, etc. It should be appreciated that while block 655 may occur geographically distant from the location at which all or parts of the other blocks of method 600 are performed. Accordingly, one desirable attribute of the method 600 is that it permits the localized manufacture of shoes to custom orders. Such localized manufacturing can be more responsive to local needs and preferences than remote manufacturing, and can provide reduced inventory and shipping costs. Accordingly, block 655 may occur geographically proximate to, or in the same facility, as does the remainder of the blocks of method 600.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

What is claimed is:

1. A system for performing a method for manufacturing an article of footwear according to an order placed by a customer, the system comprising:
   an order interface rendered by a processing unit to receive an order for the article of footwear;
   a work-order engine residing on the processing unit configured to manage the order, wherein the managing comprises:
   (a) generating a work order based on specifications within the order, wherein the work order includes information for implementing a dataflow and a workflow;
   (b) based on the dataflow, selecting appropriate stations on a manufacturing floor to participate in the manufacturing process, wherein the appropriate stations selected include at least an outsole station, a midsole station, and a upper component station;
   (c) based on the workflow, instructing each of the appropriate stations to perform a sequence of operations that result in fabricating components of the article of footwear, wherein, upon assembly of the components, the article of footwear embodies the specifications of the order;
   (d) selecting bar codes from pre-established listing that identify an outsole component, a midsole component, and an upper component as being fabricated based on the order, wherein one or more of the selected bar codes are coupled with the outsole component, the midsole component, and the upper component during the sequence of operations; and
   one or more devices configured to assemble the footwear using at least the outsole component, the midsole component, and the upper component based on the selected bar codes.

2. The system according to claim 1, wherein the process of managing, performed by the work-order engine, further comprises distributing the sequence of operations to the appropriate stations based on the dataflow.

3. The system according to claim 2, wherein the outsole station is configured to fabricate the outsole component of the article of footwear in compliance with the specifications, upon carrying out the sequence of operations distributed thereto.

4. The system according to claim 3, wherein the midsole station is configured to fabricate the midsole component of the article of footwear in compliance with the specifications, upon carrying out sequence of operations distributed thereto.

5. The system according to claim 4, wherein the upper station is configured to fabricate the upper component of the article of footwear in compliance with the specifications, upon carrying out sequence of operations distributed thereto.

6. The system according to claim 5, wherein the appropriate stations on the manufacturing floor further comprise a lower assembly station that assembles the outsole component and the midsole component into a lower component, based on the one or more bar codes coupled thereto.

7. The system according to claim 6, wherein the appropriate stations on the manufacturing floor further comprise an assembly and lasting station that assembles the lower component and the upper component, based on the one or more bar codes coupled thereto.

8. The system according to claim 1, further comprising a first database that receives options from a design source, wherein the options allow a customer to customize the article of footwear.

9. The system according to claim 8, wherein the order interface is further configured retrieve the options from the first database when the customer is placing the order, wherein the options comprise at least one of model options, functional options, or aesthetic options.

10. The system according to claim 9, wherein receiving the order for the article of footwear at the order interface comprises receiving selections manually input by the customer that are directed toward one or more of the options.

11. The system according to claim 10, further comprising a second database, accessible to the work-order engine, configured to persist the one or more selected options in association with the customer.

12. The system according to claim 11, wherein the process of managing, performed by the work-order engine, further comprises:
   accessing the one or more selected options associated with the customer; and
   converting the one or more selected options into the specifications within the order associated with the customer.

13. The system according to claim 1, wherein the process of managing, performed by the work-order engine, further comprises:
   inserting the order into a workload schedule; and
   associating a completion deadline with the inserted order, wherein the completion deadline is based on a timeframe at which the order was received at the order interface.

14. The system according to claim 13, wherein the process of managing, performed by the work-order engine, further comprises:
   comparing specifications of other orders in the workload schedule against the specification of the order to determine a presence of common selected options therein; and
   grouping the order with one or more of the other orders within the workload schedule and the completion deadline.

15. An article of footwear that is manufactured according to an order placed by a customer, the process of manufacturing comprising:
   receiving an order for the article of footwear at an order interface, wherein the process of receiving includes:
   (a) retrieving options from a storage location that comprise at least one of model options, functional options, or aesthetic options;
   (b) rendering the options at an order interface; and
   (c) receiving selections manually input by the customer that are directed toward one or more of the options;
   converting the selected options into specifications of the ordered article of footwear;
   based on the specifications, generating a work order that includes information for implementing a dataflow and a workflow, wherein the work order facilitates managing satisfaction of the order;

selecting appropriate stations on a manufacturing floor to participate in the manufacturing process in accordance with the dataflow, wherein the appropriate stations selected include at least an outsole station, a midsole station, and a upper component station;

distributing a sequence of operations to the appropriate stations in accordance with the dataflow;

instructing each of the appropriate stations to perform the sequence of operations in accordance with the workflow, wherein the sequence of operations result in fabricating components of the article of footwear that, upon assembly, embody the ordered article of footwear;

selecting bar codes from pre-established listing that identify an outsole component, a midsole component, and an upper component as being fabricated based on the order, wherein one or more of the selected bar codes are coupled with the outsole component, the midsole component, and the upper component during the sequence of operations; and assembling the footwear using at least the outsole component, the midsole component, and the upper component based on the selected bar codes.

16. A method for manufacturing an article of footwear according to an order placed by a customer, the method comprising:

receiving an order for the article of footwear at an order interface, wherein the order is placed, in part, upon the customer selecting one or more options related to at least one of a model, functionality, or aesthetics of the article of footwear;

converting the one or more selected options into specifications of the ordered article of footwear;

based on the specifications, generating a work order that includes information for implementing a dataflow and a workflow, wherein the work order facilitates managing satisfaction of the order;

selecting, using a computer processor, appropriate stations on a manufacturing floor to participate in the manufacturing process in accordance with the dataflow, wherein the appropriate stations selected include at least an outsole station, a midsole station, and a upper component station;

distributing a sequence of operations to the appropriate stations in accordance with the dataflow;

instructing each of the appropriate stations to perform the sequence of operations in accordance with the workflow, wherein the sequence of operations result in fabricating components of the article of footwear that, upon assembly, embody the ordered article of footwear;

selecting bar codes from pre-established listing that identify an outsole component, a midsole component, and an upper component as being fabricated based on the order, wherein one or more of the selected bar codes are coupled with the outsole component, the midsole component, and the upper component during the sequence of operations; and assembling the footwear using at least the outsole component, the midsole component, and the upper component based on the selected bar codes.

17. The method according to claim 16, further comprising, based on the distributed sequence of operations, instructing each of the outsole station, the midsole station, and the upper station to fabricate an outsole component, a midsole component, and an upper component, respectively, that comply with the specifications of the ordered article of footwear.

18. The method according to claim 16, wherein selecting appropriate stations on a manufacturing floor to participate in the manufacturing process comprises:

determining a workload capacity of each of the outsole station, the midsole station, and the upper station;

accessing a workload schedule, wherein the workload schedule includes the order; and based on the determined workload capacity with respect to the workload schedule, ascertaining whether to select one or more of the outsole station, the midsole station, and the upper station for participation in the manufacturing process.

* * * * *